May 21, 1935. C. I. JUSTHEIM Re. 19,581

VENTURI TUBE

Original Filed Jan. 11, 1934

Inventor

Clarence I. Justheim

By R. M. Thomas

Attorney

Reissued May 21, 1935

Re. 19,581

UNITED STATES PATENT OFFICE 19,581

VENTURI TUBE

Clarence I. Justheim, Salt Lake City, Utah

Original No. 1,973,714, dated September 18, 1934, Serial No. 706,308, January 11, 1934. Application for reissue March 21, 1935. Serial No. 12,305

7 Claims. (Cl. 230—92)

My invention relates to Venturi or suction tubes and has for its object to provide a new and efficient suction tube which may be used to create suction in any desired place, such as upon aeroplanes for actuating their wind instruments, on automobiles to gauge wind resistances when traveling, or to actuate the speedometer of the automobile, or to be used in the suction device for mixing fuel and air for carburetion of the fuel for the engine.

A further object is to provide a suction device which has the interior form so designed that it will accomplish the best results obtainable with a suction tube either when used with gas or fluids. A still further object is to provide a suction Venturi tube for drawing fluids therethrough to increase the suction in the ports thereof, the design being such as to create the greatest suction obtainable with this type of device.

These objects I accomplish with the device illustrated in the accompanying drawing in which similar numerals and letters of reference indicate like parts throughout the several views and as described in the specification forming a part of this application and pointed out in the appended claims.

In the drawing in which I have shown the device

Figure 1:
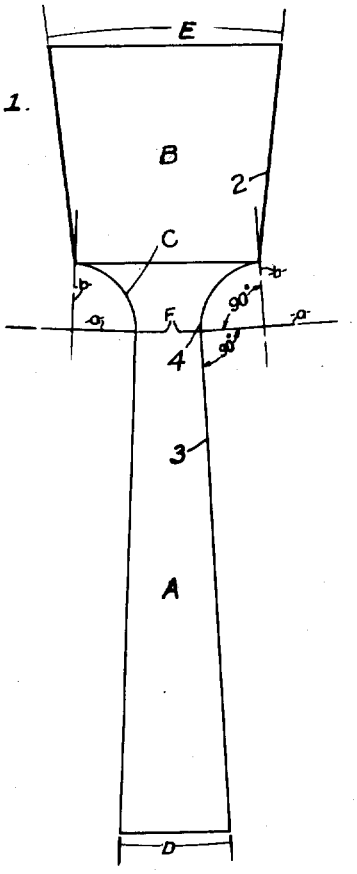
Figure 1 is a diagrammatic view to illustrate the proper manner of laying out the design for the tube with the correct and most efficient angles of flare used therein.

This application is a segregation of portions of the patent application filed by me on February 2, 1932, Serial Number 590,493, for Suction and vaporizing devices.

In the drawing I have shown the device as made of opposed frusto-conical chambers A and B joined together by a curved wall C with the angles of flare and the diameters and radii figured out to give the most efficient device possible.

In Figure 1, the diagrammatic view, the manner of building the device is shown. The flare A is made by first laying out the walls thereof with a predetermined flare. This tube is preferably eight inches long with an internal diameter at the small end F of 1 inch. At the small end of the flared tube A, I then lay off a line *a* perpendicular to the wall 3 and then using a radius equal to the diameter of the small end, I then scribe the curved wall C. With the line *a* as a base, I then erect a perpendicular line *b* thereto, the base of the line starting at the center of the curve. At the juncture of this line *b* to the curved wall C, I form the walls 2 of an opposed flare chamber B. The wall 2 of the chamber B is joined to the curved wall C at a point which will not be tangential to the curve, and the small end of the chamber B is of larger diameter than the small end of the chamber A.

The larger diametered tube B is made of a length to provide sufficient distance from the entrance thereinto, to the curved walls C, to produce the desired suction for the tube, so that this distance when measured will be greater than the inner diameter of the small end of the chamber A where it joins the curved wall. This is a shorter distance as shown in the drawing than the length of the standard short tube when considering the diameter of the entrance of the tube B; as shown in the drawing, when this length is sufficient for the fluids to engage the walls of the tube B after having made their usual entrance arc therein, this length will then increase the efficiency of the device.

In order to retain the volumetric efficiency of the tube, several variables have to be taken into consideration when designing it. These variables are approximately as follows: angles of convergence and divergence of frustums B and A respectively; construction of curve C to the lesser diametered frustum A and the length of the frustum B as compared to the diameter of the constriction F.

It is a well known fact that the quantity of gas or liquid which passes the constriction F will be equal to the area or cross section at F multiplied by the velocity.

It is also a fact that the velocity past any point in the tube is the medium for producing the suction at this particular point. That is, should a tube connected to fuel, be inserted at this point a certain suction acts upon it. As the velocity past this point is the factor for producing the suction on the inserted tube and the velocity at this particular point in the frustum depends upon its distance from the entrance of the frustum B, the length of the frustum B is a definite factor in the design of the conical converging tube B when considering the combination of B, C and A.

Figure 2:
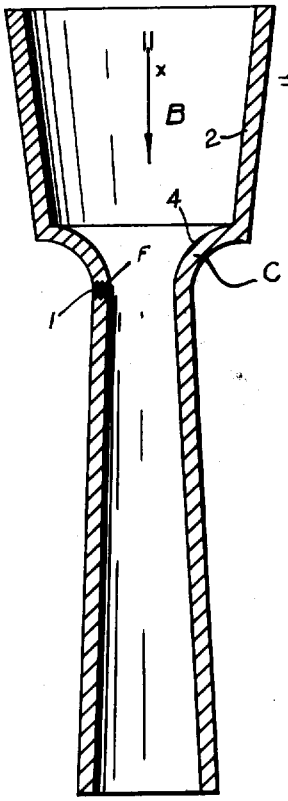
Figure 2 is a diametrical section of the device showing the use of only one suction port.

In Figure 2 of the drawing a port 1 leads into the interior of the device at that juncture of the curved wall C to the chamber A at the point at which the inner wall 3 of the chamber A is tangential to the inner wall 4 of the curve C. The port is formed or bored through the wall with the axis thereof in alignment with the juncture of the curved wall to the flared wall 3 but slight variation may be made without departing from the efficiency of the device to any great degree.

Figure 3:
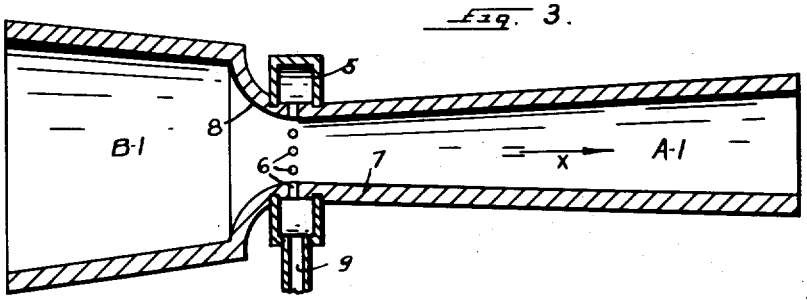
Figure 3 is a diametrical section of the device showing the use of a ring of ports through the device into an annular ring, to create suction in the ring, and thereby from the device to which the lead line from the ring is attached.

In Figure 3 of the device the juncture of the curved wall to the chamber A is surrounded by an annular chamber 5 formed of two halves secured together to form the completed chamber and the interior of the chamber 5 is in connection with the interior of the device by the row of ports 6 bored through the wall 7 of the flared chamber A1 at the tangential juncture of the curved wall 8 to the wall 7. A lead line 9 draws from any suitable or desired source or creates suction in any instrument to which the device may be attached.

An arrow $x$ shows the direction of travel of fluids through the device.

In using this Venturi tube as a carburetor suitable control valves must be provided to control the suction through the device, and these valves may be mounted at either end of the suction device or at both ends if so desired.

Through experimentation, the following table was worked out for the flared chamber B to show the various results using different flares, thus showing, that the best angle of flare is that described.

| Angle E | 0°0′ | 3°10′ | 7°52′ | 10°20′ | 13°24′ | 19°28′ | 29° 58′ | 48°50′ |
|---|---|---|---|---|---|---|---|---|
| $C_c$ | 0.829 | 0.894 | 0.931 | 0.950 | 0.962 | 0.970 | 0.975 | 0.984 |
| $C_v$ | 1.000 | 1.001 | 0.998 | 0.987 | 0.983 | 0.953 | 0.919 | 0.861 |
| C | 0.829 | 0.895 | 0.929 | 0.938 | 0.946 | 0.924 | 0.896 | 0.847 |

The contraction coefficients were then deduced from $C_c = C \div C_v$.

The method of obtaining the coefficient of velocity makes no allowance for the retardation of the particles in the chamber B by the atmosphere; hence the coefficients may be a little small, and the contraction coefficients would then be too large, as deduced from the above equation.

This would seem to account for the value 1.001, as seen in the second column.

Relative to the chamber A, the chief loss of head in the standard short tube is occasioned by the sudden enlargement of the contracted vein to fill the full section of the tube. Thus the curve C of chamber A is formed with the walls to fit the curve of the passing fluid in order to obtain the greatest efficiency.

Having thus described my invention, I desire to secure by Letters Patent and claim:

1. In a Venturi tube, the combination of opposed frusto-conical axially aligned chambers joined together by a curved wall with the chamber into which the fluid is introduced of larger diameter than the other chamber, and with the smaller chamber tangential to the curved wall.

2. In a Venturi tube, the combination of a flared chamber having the small end joined onto an inwardly curved wall; another flared chamber joined onto the end of the curved wall with the walls thereof tangential to the curve; and a port through the tangential juncture of the curved wall to the flared chamber.

3. In a device of the class described, the combination of a frusto-conical chamber joined to an opposed frusto-conical chamber by a curved wall with the smaller diametered chamber joined to the curved wall so that the walls are tangential to the curve; a row of annular ports through the tangential juncture of the chamber to the curved wall; a chamber surrounding said row of ports; and a suction line from said chamber.

4. In a Venturi tube of the class described, the combination of a frusto-conical chamber joined to an opposed smaller diametered frusto-conical chamber by a curved wall with the smaller diametered chamber tangential to the curved wall; ports into the interior of the Venturi tube; an annular chamber surrounding said ports; and a suction line connected with said annular chamber.

5. In a Venturi tube the combination of a flared chamber having the small end joined onto an inwardly curved wall with the length of the chamber greater than the inner diameter of the curved wall; another flared chamber joined onto the end of the curved wall with the walls thereof tangential to the curved wall.

6. In a Venturi tube the combination of opposed frusto-conical axially aligned chambers joined together by a curved wall with the chamber into which the fluid is introduced of larger diameter than the other chamber and of greater length than the diameter of the juncture of the curved wall portion with the smaller chamber tangential to the curved wall.

7. In a Venturi tube the combination of a frusto-conical chamber joined to an opposed frusto-conical chamber of larger diameter by a curved wall with the radii of the curved wall on lines perpendicular to the wall of the smaller diametered chamber at the juncture with the curved wall.

CLARENCE I. JUSTHEIM.